Patented July 28, 1942

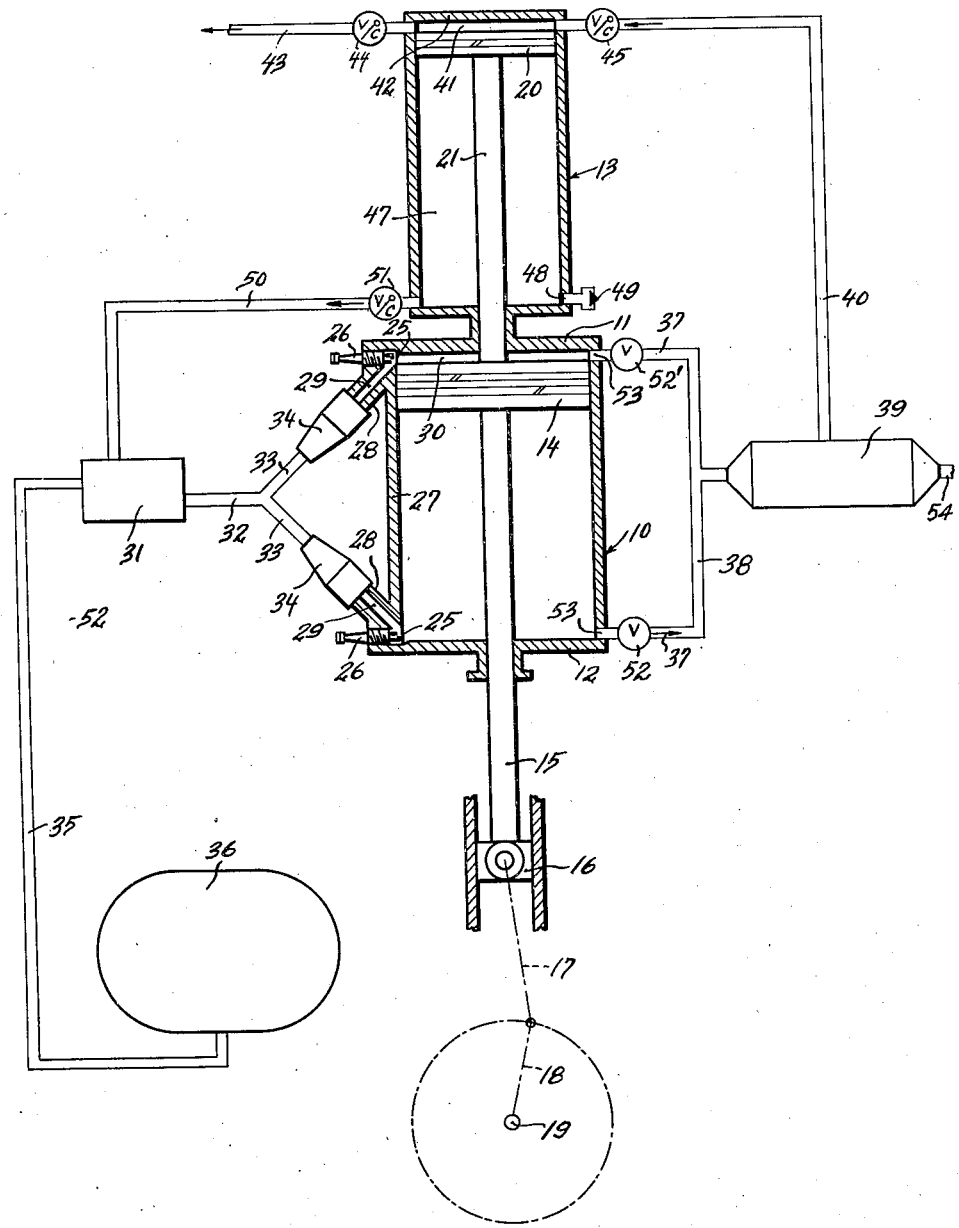

2,291,594

UNITED STATES PATENT OFFICE 2,291,594

INTERNAL COMBUSTION ENGINE

John Phillips, New York, N. Y., assignor to United States of America

Application July 20, 1939, Serial No. 285,578

1 Claim. (Cl. 123—119)

This invention relates to internal combustion engines and more particularly to a method and system for operating a double acting two cycle engine and has for its principal object to provide for operating such an engine at the maximum efficiency per unit of fuel consumed.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing wherein the figure shows diagrammatically an embodiment of an internal combustion engine, parts thereof being shown in section.

Referring to the drawing in detail, 10 denotes the cylinder of the double acting two stroke cycle internal combustion engine provided with upper and lower cylinder heads 11 and 12. Arranged co-axially with the cylinder 10 and connected to the upper cylinder head 11 in any desired manner is a pump cylinder 13. Operable within the cylinder 10 is a piston 14 secured to a piston rod 15 which projects outwardly of the lower cylinder head 12 for connection to a cross-head 16, which latter in turn is connected by the connecting rod 17 and crank 18 to the engine crankshaft 19. Also operable within the pump cylinder 13 is a piston 20 secured to the end of a piston rod 21, the piston rod 21 being disposed co-axial with the piston rod 15 and rigidly connected thereto for simultaneous movement therewith.

Provided, one at each end of the engine cylinder 10 within the respective cylinder heads is a firing chamber or well 25 arranged in opposed relation to each other and into each of which is fitted a spark-plug 26. Adjacent each spark plug 26, there is formed on the cylinder wall 27 a boss 28 formed with a passage 29 communicating with the well 25 at a point closely adjacent to the inside surface of its respective cylinder head. The arrangement of the wells 25 and passages 29 is such as to provide at each end of the cylinder when the piston is at the end of its stroke a compression chamber 30 of a predetermined small volumetric capacity, as clearly shown in Fig. 1.

Fuel charges of a combustible gas mixture is supplied to the engine cylinder 10 by a carburetor 31, which is connected by an intake manifold 32 having branches 33 to the bosses 28. In each branch 33 there is placed a gas injector 34 operative to discharge under pressure into the chamber 30 on each side of the piston a predetermined charge of fuel at the proper sequence in the cycle of operation of the engine. The gas injectors 34 are of any known make and are operated under the pressure of air received by the carbureter 31 from pipe 50 as will be hereinafter described to provide the discharge under pressure of the fuel into the engine cylinder. The carburetor 31 is connected by a pipe 35 to a gasolene supply tank 36. At points on the cylinder wall 27 opposite the passages 29 there is connected the terminal branches 37 of an exhaust manifold 38 which in turn is connected to a muffler 39. A pipe 40 communicates the interior of the muffler 39 with the chamber 41 above the piston 20 in the pump cylinder 13, being connected to said pump cylinder at a point immediately adjacent the closed end 42 of said cylinder. Communicating the chamber 41 with the atmosphere is a vent pipe 43 controlled by a check valve 44. A similar check valve 45 controls the passage of gas in the pipe 40.

The chamber 47 in the pump cylinder 13 defined between the piston 20 and the lower end of said cylinder is provided with an air inlet 48 controlled by a check valve 49, and a discharge pipe 50 controlled by a check valve 51 communicating said chamber 47 with the carburetor 31.

The carburetor 31 is designed to supply to the engine a combustible gas mixture made up of vaporized gasolene and air. Air admitted under atmospheric pressure and compressed by the pump 13 in the chamber 47 during the operation of the engine is preheated both by virtue of the pump cylinder and piston being heated by the exhaust gases and also in the compression thereof, and is discharged into the carburetor 31 under predetermined pressure, the air pump serving to all intents and purposes as a super-charger.

The cycle of operation of the engine is as follows: a supply of the combustible gas mixture is discharged into the chamber 30 (when the piston 14 is at one or the other end of its stroke) by the adjacent injector 34 which is immediately followed by ignition thereof upon function of the spark plug 26, the explosion of the gas driving the piston 14 downwardly. In the arrangement of parts shown in Fig. 1 the upper injector 34 has operated to supply gas to the chamber 30, to be ignited to drive piston 14 downwardly. On the downstroke the vacuum created in the chamber 41 of the pump 13 will exhaust from the muffler 39, the burnt gases discharged thereunto from below the piston 14 to be received into the chamber 41 from which it is discharged into the atmosphere through the vent pipe 43 on the upstroke. On the upstroke air is drawn into the chamber 47 of the pump 13 and compressed on the downstroke to be discharged into the carburetor. Suitable exhaust valves 52' are provided at the exhaust ports 53 of the engine, operating in timed sequence to permit exhaust of the burnt gases to the muffler 39. When the engine piston 14 has reached the end of its downstroke the lower injector 34 operates to discharge a supply of the combustible gas mixture into the chamber (30) between the piston 14 and lower cylinder head 12, followed by a firing thereof by the lower spark plug to drive the piston 14 upwardly, the burnt gases above the piston 14 being meanwhile exhausted into the muffler 39 and out thru the pipe 54.

It is thus seen that the above described filtering system utilizes the waste and residual gases of the internal combustion engine to provide a supply of a mixture of reconditioned combustible gas. The carburetor 31 is operative to mix this reconditioned gas with gasolene vapor and supercharged air to provide a superior fuel supply for the engine to insure a maximum in efficiency and economy in the operation thereof.

Having thus described my invention, I claim as new and desire to secure by Letters Patent:

An internal combustion engine comprising a cylinder closed at each end, a piston reciprocating therein, a firing chamber at each end of the cylinder, a spark plug in each firing chamber, a carburetor connected to a fuel supply, an intake manifold connecting the carburetor with each firing chamber for supplying a combustible gas mixture thereinto, and injector means provided at each end of the intake manifold arranged to inject said combustible gas mixture into the adjacent firing chamber in timed relation to the cycle of operation of the engine, the construction and arrangement being such whereby to provide a power stroke for each stroke of the piston, including a pump cylinder fixedly secured in co-axial relation to the head end of the engine cylinder, a pump piston reciprocating within said pump cylinder dividing the same into two separate and functionally distinct pumping chambers, a piston rod connecting said pump piston to said engine piston for simultaneous movement therewith, exhaust manifold and muffler means connecting one engine chamber to one of the pump chambers, said one pump chamber being operative to exhaust and discharge into the atmosphere the exhaust gases of said engine cylinder only during one stroke of the engine piston, an air inlet check valve in the other pump chamber, said other pump chamber being operative to admit air at atmospheric pressure during said one stroke of the engine piston and to preheat and compress the same to be supplied to said carburetor during the other stroke of the engine piston.

JOHN PHILLIPS.